(12) United States Patent
Denison (10) Patent No.: US 7,347,982 B2
(45) Date of Patent: Mar. 25, 2008

(54) APPARATUS AND METHOD FOR RECOVERING CARBON BLACK FROM PYROLYSIS BYPRODUCTS

(75) Inventor: Gilbert W. Denison, Norman, OK (US)

(73) Assignee: Federal Recycling Technologies, Inc., Norman, OK (US)

( * ) Notice: Subject to any disclaimer, the term of this patent is extended or adjusted under 35 U.S.C. 154(b) by 674 days.

(21) Appl. No.: 10/450,105

(22) PCT Filed: Dec. 14, 2001

(86) PCT No.: PCT/US01/48071

§ 371 (c)(1),
(2), (4) Date: Jun. 10, 2003

(87) PCT Pub. No.: WO02/48041

PCT Pub. Date: Jun. 20, 2002

(65) Prior Publication Data

US 2004/0047779 A1    Mar. 11, 2004

Related U.S. Application Data

(60) Provisional application No. 60/256,005, filed on Dec. 15, 2000.

(51) Int. Cl.
*C09C 1/48* (2006.01)

(52) U.S. Cl. .................. 423/449.1; 423/461; 423/449.7
(58) Field of Classification Search ............. 423/449.1, 423/449.3, 449.7, 461
See application file for complete search history.

(56) References Cited

U.S. PATENT DOCUMENTS

| | | | |
|---|---|---|---|
| 3,823,224 A | | 7/1974 | Laman et al. |
| 3,978,199 A | * | 8/1976 | Maruhnic et al. ........ 423/449.7 |
| 4,264,568 A | | 4/1981 | Haas et al. |
| 5,560,892 A | | 10/1996 | Bennett et al. |
| 5,658,704 A | * | 8/1997 | Patel et al. ............ 430/137.19 |

FOREIGN PATENT DOCUMENTS

JP        58222157 A    *   12/1983

* cited by examiner

*Primary Examiner*—Stuart Hendrickson
(74) *Attorney, Agent, or Firm*—James F. Harvey, III; Doerner Saunders Daniel & Anderson LLP (57) ABSTRACT

A system (10), process and apparatus are disclosed for purifying carbon black (15) containing sulfur and metal oxide impurities by digesting (20) the impure carbon black in an acid to extract the metal oxide (25). Sulfur (45) is then removed from the acid treated carbon black (30) by solvent extraction (35) with an organic aromatic solvent which is then recovered (50). The purified carbon black (40) is then suitable for use as a toner (60) by toner black processing (55).

21 Claims, 4 Drawing Sheets

FIG. 3

APPARATUS AND METHOD FOR RECOVERING CARBON BLACK FROM PYROLYSIS BYPRODUCTS

CROSS-REFERENCES TO RELATED APPLICATIONS

This patent application claims the benefit of U.S. Provisional Application No. 60/256,005, filed Dec. 15, 2000, of the same or similar title.

TECHNICAL FIELD

The present invention relates to the field of chemical processes, and deals more particularly with a system, method, and apparatus for recovering carbon black from pyrolysis byproducts. Still more particularly, the invention relates to a system, method, and apparatus for removing impurities from carbon black produced as a byproduct of a scrap rubber pyrolysis system, resulting in a high purity carbon black product suitable for use in such end products as inks, toners, toner cartridges, copiers, and other laser-type devices.

BACKGROUND ART

The literature is replete with various systems and methods for pyrolyzing scrap rubber, such as that found in worn out vehicle tires, into carbon black solids, low density hydrocarbon gases, and liquid hydrocarbon oil. Such a system is described in U.S. Pat. No. 5,894,012, issued to Denison, incorporated by reference, which describes a pyrolysis subsystem, a carbon black refinement subsystem, and a pyrolysis oil subsystem. Such systems accept feedstock consisting of shredded vehicle tires, pyrolyze the shreds to produce hydrocarbons and an impure carbon black. The system may comprise additional subsystems to further refine the hydrocarbons and/or carbon black. These additional subsystems will remove any metals and fiberglass shards from the carbon black byproduct for produce a fairly high grade carbon black containing metal oxide particles and sulfur particles remaining from the devulcanizaton action provided by the basic pyrolysis process.

It has been found through experience that while the carbon black produced by such systems can be of exceedingly high grade, it still contains chemical impurities which are difficult to remove. For example, carbon black reclaimed from scrap tires contains about 2.5 wt % sulfur as well as metallic impurities and silica, and these impurities are inherent in the carbon black resulting from the pyrolysis of tire shreds. Such impurities render this carbon black unsuitable for products which require a very highly refined grade of carbon black, such as toners for use in xerography equipment and laser printers. Such highly refined carbon black is normally produced directly from hydrocarbons which have few impurities to begin with, and not from scrap rubber which contains high amounts of sulfur and zinc compounds. If an economical way could be found to further refine the carbon black resulting from various scrap rubber pyrolysis processes of the prior art, then the value of the pyrolysis process could be enhanced by the higher marketability of the resulting carbon black byproduct. Such a product might also be highly competitive with existing processes producing toner black directly from hydrocarbons.

Accordingly, what is needed is an improved system, process, and apparatus for refining and purifying carbon black produced as a byproduct of scrap rubber pyrolysis processes, and in particular, from scrap rubber provided by shredded vehicle tires.

DISCLOSURE OF INVENTION

It is therefore an object of the present invention to provide an improved system, process, and apparatus for producing an extremely high grade of carbon black by refining and purifying the carbon black typically produced as a byproduct of scrap tire pyrolysis processes.

Another object of the present invention is to provide an improved carbon black purification system for producing marketable carbon black of a purity suitable for use in inks and toner cartridges.

It is another object of the present invention to provide an improvement to existing pyrolysis systems known to the art, by providing carbon black purification subsystem for removing sulfur and metal oxide particles typically contained in the carbon black byproduct of such scrap tire pyrolysis systems.

It is another object of this invention to provide a carbon black purification system which will remove metal oxide and sulfur particles from impure carbon black which may be available from any source.

It is a another object of this invention to provide a carbon black purification system which does not harm the environment by emitting pollutants or harmful waste byproducts.

It is another object of this invention to provide an continuous, automated, and precisely controlled system for purification of carbon black to ensure uniform and consistent results.

It is another object of this invention to provide an carbon black purification system which continuously produces refined carbon black in industrial quantities.

It is another object of this invention to provide a toner black production capability for the production of toner black.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and apparatus for producing marketable carbon black from carbon black byproducts typically provided by scrap tire pyrolysis systems. The process described herein has as its input material, or feedstock, a carbon black product containing contaminants such as metal oxide and sulfur particles. One embodiment of the process for practicing the invention preferably comprises of a two steps. One step consists of using hydrochloric acid to remove any metal oxide particles from the carbon black feedstock. The other step consists of using a solvent to remove the sulfur particles from the remaining carbon black feedstock. The two steps can be performed in any order.

In another alternative embodiment, the process may further comprise a toner black step, wherein the carbon black from which the metal oxide and sulfur particles have been removed is combined with magnetite (black iron oxide) and small amounts of flow control agents and toner modifying agents to create a high quality toner black suitable for use in such end products as inks and toner cartridges.

The invention teaches the use of a closed solvent recovery process, in which solvent used in the solvent extraction step is recovered and reused from a closed system. This closed solvent recovery process eliminates the requirement for continuous supplies of solvent to the process by capturing the solvent vapor, condensing it, and returning it to the solvent extraction process. This prevents release of solvent vapors into the surrounding atmosphere, reduces the risk of hazardous levels of toxic materials, and provides a safe workplace for workers involved in the processing of carbon black. The invention further teaches the use of a closed steam generation process, in which the water vapor used in the form of steam for drying and evaporation throughout both steps of the invention and the water used for dilution within the metal oxide extraction step are captured and retained for reuse within the system. The water used within the system must be free of minerals in order to reduce scale and mineral deposits within water transmission paths of the system. This may be accomplished by continuous use of distilled water. However, by reusing a fixed amount of distilled water within a closed system in the manner taught by the invention, the requirement for continuous distilled water by the system is kept to a minimum.

The technique comprising the invention requires sufficient amounts of solvent, hydrochloric acid, and an acid neutralizing agent to remove the impurities. Hydrochloric acid and the neutralizing agent are used in such a way as to produce harmless salts as a waste byproduct, and the solvent is employed in a closed system which results in no release of solvent vapors to the atmosphere. The result is a process which is benign to the environment and acceptable under current federal regulations of the Unites States Government which control toxic emissions from commercial and industrial processes.

The present invention will now be described with reference to the following drawings, in which like reference numbers denote the same element throughout.

BRIEF DESCRIPTION OF DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood; however, that the invention is not limited to the precise arrangements and configurations shown. In the drawings, like numerals are used to indicate like elements throughout. In the drawings.

BEST MODES FOR CARRYING OUT THE INVENTION

The present invention defines techniques for the refinement and purification of carbon black feedstock containing impurities so as to render it suitable for use in toner black applications. The invention is illustrated schematically in FIG. 1, wherein an embodiment 10 of a process practicing the invention is shown. Feedstock 15 for the process generally consists of unrefined carbon black material containing impurities which render it unusable for toner black as required by inks, laser printers, copiers, and the like. If the impure carbon black feedstock 15 is the result of a scrap rubber pyrolysis process, it will generally contain metal oxides (primarily zinc oxide, ZnO, about 5% by weight) and sulfur (about 2.5% by weight), but no solid impurities such as metal fragments or fiberglass. The sulfur is in the form of physical particles and is not in chemical combination with the carbon black, since the scrap rubber is typically devulcanized during the pyrolysis process. Carbon black produced as a byproduct of a pyrolysis process for scrap rubber tires, as described in U.S. Pat. No. 5,894,012, is preferably used as feedstock to the present process, although other feedstocks having similar composition may also be used without departing from the scope of the invention. The process also requires Quantities of hydrochloric acid and a neutralizing agent for the digestion of metal oxides from the carbon black feedstock. The preferable neutralizing agent is sodium hydroxide, or caustic soda, chosen primarily for its availability and cost. Other alkaline compounds may also be used as a neutralizing agent without departing from the concept and scope of the invention. A quantity of solvent is used for the chemical removal of the sulfur impurities and continuously recycled. The solvent is preferably benzene, xylene, or toluene, with toluene being the most preferable solvent. The resulting outputs of the process are refined carbon black suitable for use in toner cartridges, pure sulfur, and waste solids comprised primarily of various salts, $ZnCl_2$, and other metal chlorides.

Figure 1:
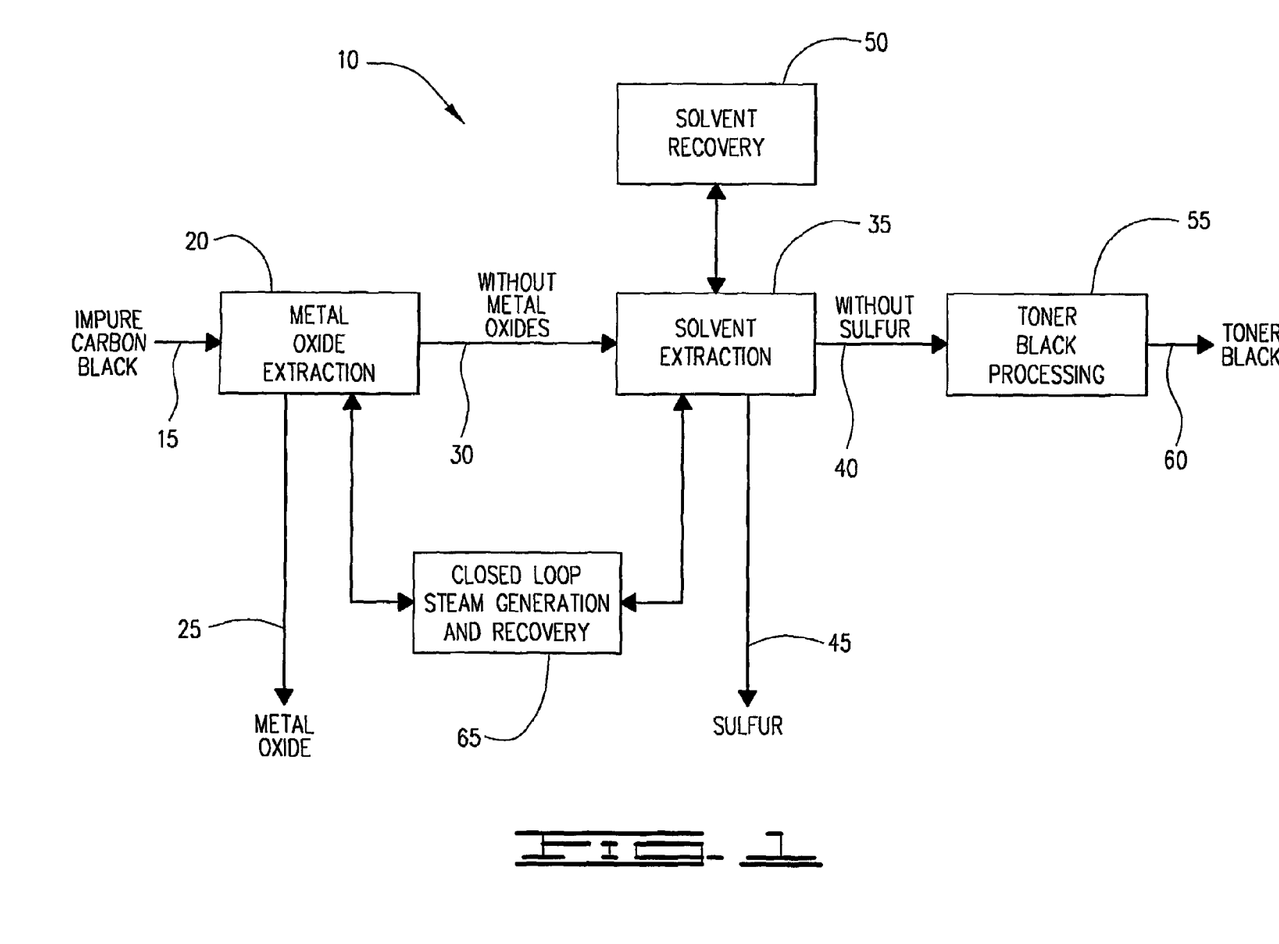
FIG. 1 is a block diagram showing the major functions comprising an embodiment of the invention.

In a preferred embodiment, as shown in FIG. 1, the process 10 may consist of three stages. The first stage consists of Metal Oxide Extraction Process 20 in which all metal oxides are removed from the unrefined feedstock material 15, also referred to as "digesting" the material, using dilute hydrochloric acid (HCl). The concentration or strength of the dilute HCl solution is chosen to ensure that the volume of liquid in the slurry thus formed in the Metal Oxide Extraction Process 20 is sufficient to allow it to be easily handled. The metal oxide products 25 are non-toxic and may be discarded by standard methods such as land fill. The second stage, or Solvent Extraction Process 35, receives the carbon black feed stock 30 with all metal oxides removed and removes sulfur from the material processed through the first stage. The solvent will dissolve the sulfur out of the carbon black feedstock 30 produced from the first stage to provide a highly refined carbon black material 40 and sulfur solid wastes 45. An optional third stage consists of a Toner Black Process 55 which accepts the now purified carbon black 40 and adds components to produce a toner black product 60.

The solvent used in the Solvent Extraction Process 35 may be benzene, toluene, or xylene, but the preferred solvent is reaction grade toluene. The solvent is added to the sulfur bearing material 30 and, using agitation at the proper temperature, the sulfur is dissolved, dried, and removed from the system as sulfur solids wastes 45. Note that carbon disulfide can also be used as solvent, but its use is discouraged due to the instability of the solvent at the temperatures used herein and the danger in handling. A Solvent Recovery Process 50 is provided to recycle the solvent and prevent gross escape of hazardous vapors. This closed loop system recovers the solvent through evaporation once it has been used to remove the sulfur particles. A Closed Loop Steam Generation and Recovery Process 65 is provided to supply heated heat exchange fluid, normally water, to various components of the Solvent Extraction Process 35 and condensed water to the Metal Oxide Extraction Process 20 for diluting the hydrochloric acid. Condensate is collected at various points from the Solvent Extraction Process 35 and recycled through the steam generation process.

Figure 2:
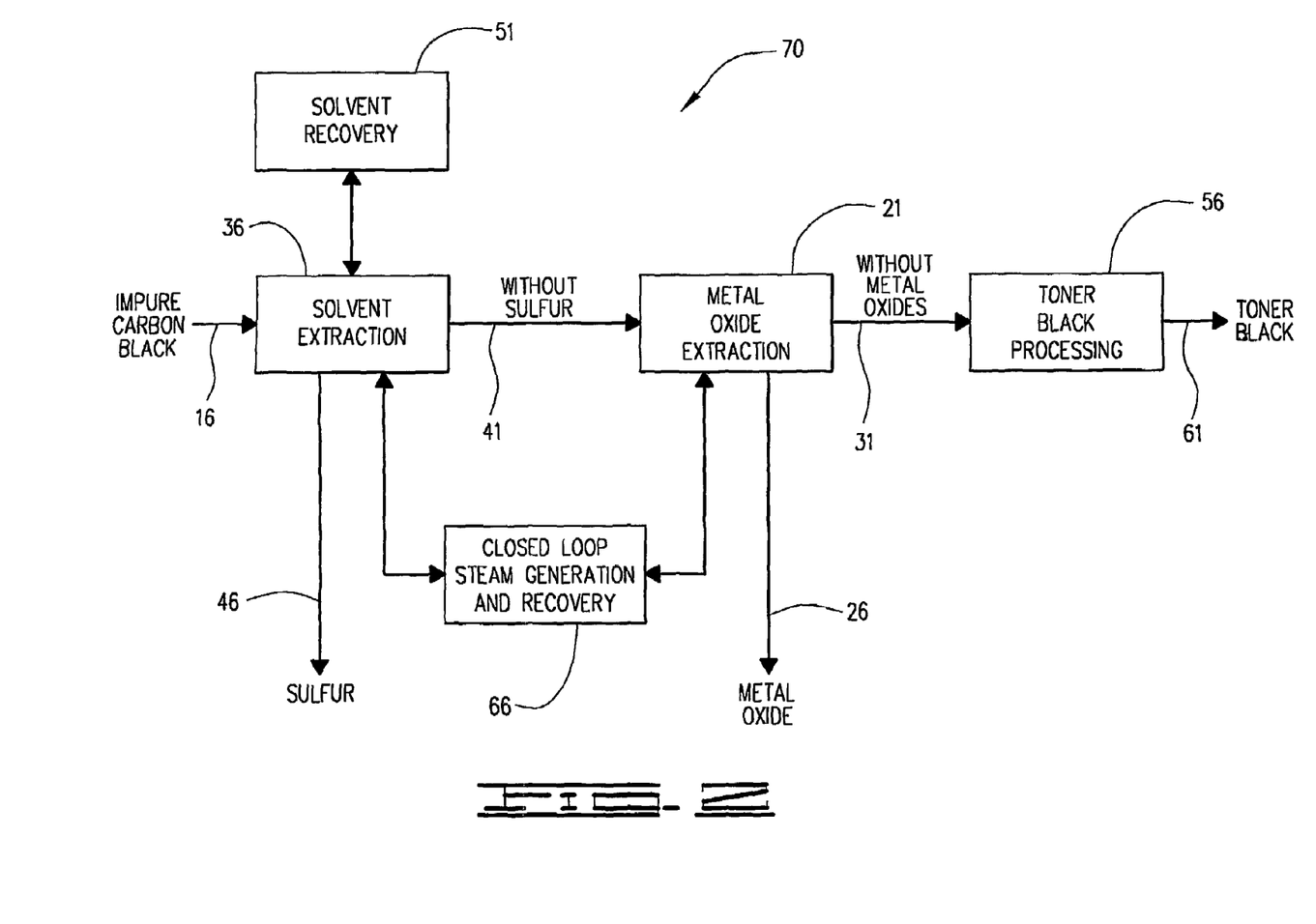
FIG. 2 is a block diagram showing the major functions comprising another embodiment of the invention.

In an alternative embodiment 70 of the invention, as shown in FIG. 2, the sequence in which the steps of metal oxide extraction and solvent extraction are performed is reversed. The Solvent Extraction Process 36 first receives the impure carbon feedstock 16 and removes sulfur and sulfur compounds therefrom. The solvent will dissolve the sulfur out of the carbon black feedstock 16 to provide a sulfur byproduct 46 and a carbon black feedstock material 41 without sulfur content but containing metal oxides. This carbon black material 41 is passed to a Metal Oxide Extraction Process 21 in which all metal oxides are removed using dilute hydrochloric acid. The Metal Oxide Extraction Process 21 produces metal oxide solids 26 as a byproduct and a highly refined and purified carbon black material 31. The metal oxide solids 26 are non-toxic and may be discarded by standard methods such as land fill. An optional third stage consists of a Toner Black Process 56 which accepts the now purified carbon black 31 and adds components to produce a toner black product 61. A Solvent Recovery Process 51 is provided to recycle the solvent and prevent escape of hazardous vapors from the system. This closed loop system recovers the solvent through evaporation once it has been used to remove the sulfur and sulfur compounds. Additional amounts of solvent are supplied as needed from a supply tank to replenish small amounts which may be lost in processing. A Closed Loop Steam Generation and Recovery Process 66 is provided to supply heated heat exchange fluid, normally water, to various components of the Solvent Extraction Process 36 and condensed water to the Metal Oxide Extraction Process 21 for diluting the hydrochloric acid. Condensate is collected at various points throughout the Solvent Extraction Process 36 and recycled through the steam generation process. It should be noted that embodiment 10 presents a slight advantage over embodiment 70, particularly when the solvent selected for solvent extraction processing is toluene. Within the Solvent Recovery Process 65, 66, the solvent is heated to a temperature in excess of the boiling point of water, as will be presently seen, in order to vaporize the toluene and remove it from the solid product. This toluene vaporization coincidentally removes any water which may be retained in the carbon black feedstock, since the boiling point of water is less than that of toluene. This provides embodiment 10 with an additional opportunity for water removal from the final carbon black product which is not present when the Solvent Extraction Process is performed prior to the Metal Oxide Extraction Process, as in embodiment 70.

In another embodiment of the invention, the Toner Black Process may be omitted so that highly purified carbon black is produced as a result of performing the Metal Oxide Extraction and Solvent Extraction Processes on the impure carbon black.

In another embodiment of the invention, the Closed Loop Steam Generation and Recovery system may be omitted when inexpensive sources of highly purified water are available or when mineral buildup within the conduits conducting condensate and/or steam is not a concern.

In another embodiment of the invention, the Solvent Recovery Process may be omitted when the carbon black purification and refinement process in used in conjunction with other industrial processes.

Figure 3:
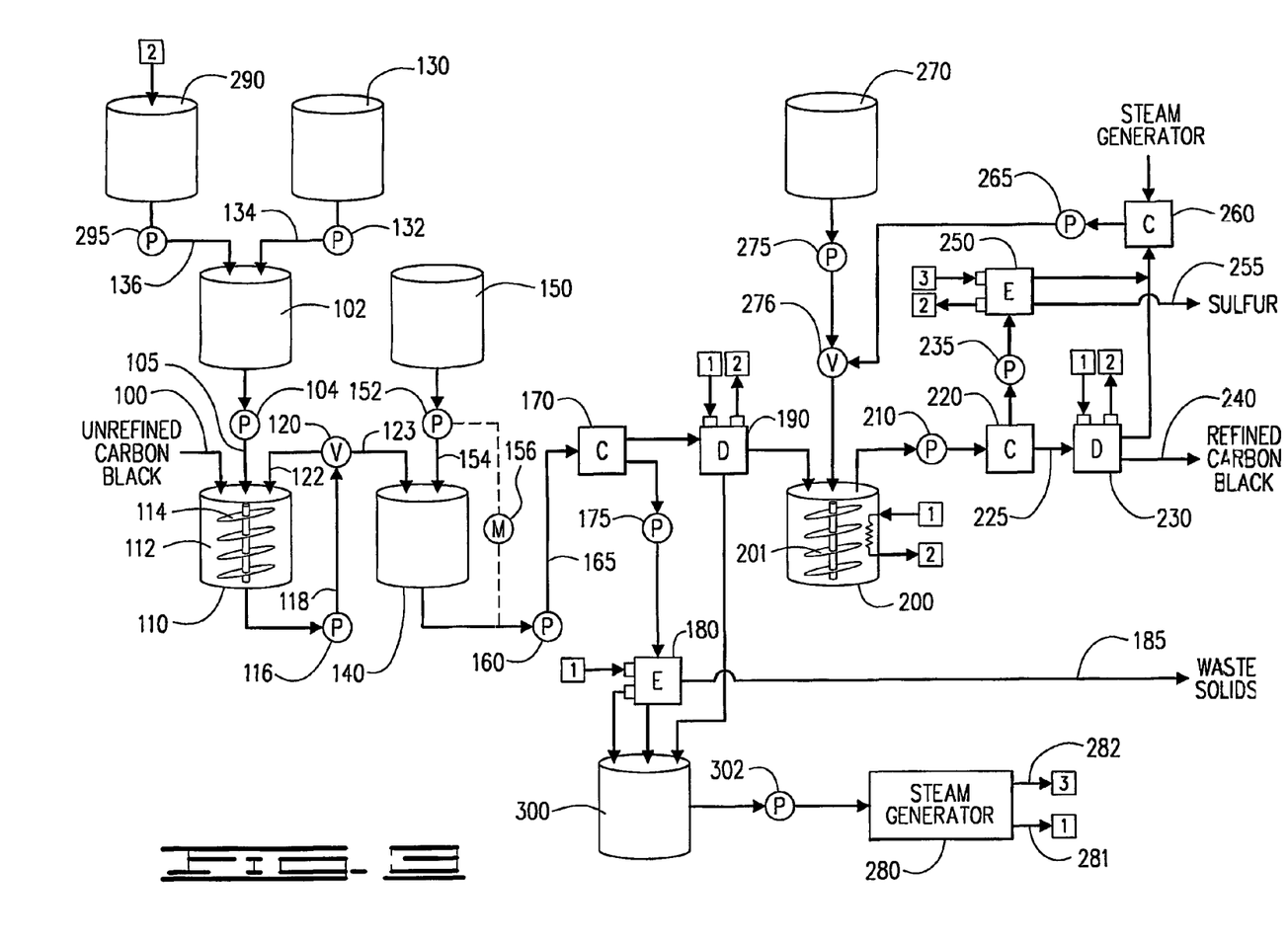
FIG. 3 is a detailed schematic diagram showing an embodiment of an apparatus designed to practice the metal oxide extraction and solvent extraction steps of the invention; and, FIG. 4 is a block diagram illustrating the primary steps comprising the toner black step.

Attention is now directed to FIG. 3, which shows a detailed schematic flow illustrating the process and method of an embodiment of the invention. During the first stage of the purification and refinement process, carbon black feedstock material 100 is digested with hydrochloric acid (HCl) in a specially constructed tank to form metallic chlorides in solution. The resulting solution is then neutralized with an alkaline neutralizing agent and the waste metal oxides are removed from the remaining solid carbon black material. Carbon black feedstock 100 consists of granular carbon black containing impurities comprising primarily sulfur and metal oxide particles. The feedstock 100 may contained in a hopper (not shown) for temporary storage prior to processing or it may be provided directly from a prior processing system without intermediate storage. In either case, it is continuously sent to the mixing tank 110 by a standard conveyance means known to the industry, such as by a conveyor, auger, or similar apparatus; a screw type conveyor is preferably used to control the rate at which the carbon black feedstock 100 is delivered and to maintain a closed system. Dilute hydrochloric acid is also sent to mixing tank 110 through conduit 105 where it combines with feedstock 100 in a mixing zone 112 therein to form a acidic slurry comprised of carbon black particles and (possibly) sulfur particles admixed in an acidic solution wherein the hydrochloric acid chemically reacts with the metal oxide particles to form metal chlorides in solution.

Concentrated hydrochloric acid (HCl) is contained in acid storage tank 130 where it is kept upon delivery to the facility until ready for use. As hydrochloric acid is expended in the process, new supplies are brought to acid storage tank 130 from external sources which are not depicted in FIG. 3. Pump 132 delivers the concentrated hydrochloric acid from acid storage tank 130 through conduit 134 to the acid dilution tank 102, where it is combined with water through conduit 136. The source of the water supplied by conduit 136 will be discussed later. The strength of the diluted hydrochloric acid must be sufficient to digest the metal oxides out of the carbon black but must also result in a slurry that has sufficient volume and density of liquid to allow it to be easily handled in a continuous manner by the equipment. A concentration of 3 normal (3N) has been found in practice to contain too little liquid for convenient handling, and a concentration of 1N gives too much volume of liquid, although both values are sufficient to digest the metal oxides. The dilute hydrochloric acid solution contained in acid dilution tank 102 is preferably maintained at a concentration of approximately 2N, although any suitable concentration may be used and still be within the scope of the invention.

Mixing tank 110 is comprised of a specially built tank vat, or container, which encloses and defines mixing zone 112. A mixing means is associated with mixing tank 110 and comprises a high shear agitator 114 within mixing zone 112, and a pump-around circuit consisting of pump 116, conduit 118, valve 120, and return conduit 122. The pump-around circuit is used to remove slurry from the bottom region of the mixing zone 112 and reintroduce it into the top region of mixing zone 112 in order to maintain and control the hold-up time that the slurry stays in the mixing zone 112. The pump-around circuit is also used to maintain consistency of the acidic slurry therein by keeping the carbon black particles admixed within the liquid in conjunction with the action of the high shear agitator 114. The acid slurry remains in mixing tank 110 where it is continuously mixed by the flow-through circuit and mixed and agitated by high shear agitator 114. Valve 120 initially directs the flow of acid slurry from conduit 118 to return conduit 122 until the level of the slurry within acid mixing tank 110 has initially reached a desired level, at which point valve 120 partially opens to split the acidic slurry stream between return conduit 122, which channels a portion of the acidic slurry back to mixing tank 110, and conduit 123, which channels a portion of the slurry into neutralization tank 140.

It should be appreciated that although single tanks, conduits, and pumps are shown in the schematic diagram, multiple components may be used without departing from the scope of the invention. A series of such mixing tanks 110 may be used to maintain a continuous process or a single tank can be employed in a batch mode, each configuration being contemplated within the scope of the present invention. Alternatively, a series of two or more mixing tanks 110 could be employed with staggered times of filling and emptying. Also, a single tank could be envisioned to operate in a continuous mode wherein it is being constantly filled and emptied at compatible rates. Nothing in this description should be construed as confining the number of such mixing tanks to a particular number or of limiting the defined digestion process to either a continuous or batch mode of operation.

The acidic slurry pumped by pump116 through conduits 118, 123 into a neutralization tank 140 is neutralized by the introduction therein of an appropriate amount of an alkaline neutralizing agent from storage tank 150. The neutralizing agent is preferably sodium hydroxide (NaOH, or caustic soda) but other alkalines may also be used without departing from the intent and scope of the invention. Standard delivery means are used to deliver the neutralizing agent to storage tank 150 where it is stored for subsequent use in the process. The amount of neutralizing agent used to neutralize the slurry is controlled by metering pump 152 which pumps the neutralizing agent from storage tank 150 through conduit 154 into neutralization tank 140. Metering pump 152 is responsive to a pH meter 156 which measuring the pH of the neutralized slurry as it exits neutralization tank 140, so that the precise amount of neutralizing agent can be introduced to maintain a neutral pH of 7 therein. The neutralization process causes a chemical reaction between the alkaline neutralizing agent and the remaining acid to form water with metal chloride salts and possibly other salts in solution.

A separation means is provided for separating the metal chlorides and other salts from the neutralized slurry. The neutralized slurry is delivered by pump 160 through conduit 165 into a separation means 170 which separates the aqueous solution containing the dissolved salts from the feedstock solids from which the metal oxides have been removed and which now may contain only carbon black and sulfur particles. Separation means 170 is preferably a centrifuge type device, and most preferably a pusher-type centrifuge which removes the feedstock particles of carbon black and sulfur while maintaining a small particle size. Other types of separation means such as filtration devices employing gravity or vacuum techniques may also be used without departing from the scope of the invention. The aqueous solution containing dissolved salts coming from the separation means 170 is pumped by pump 175 into evaporator 180 where the water is removed to leave only waste solids 185 consisting of salts of zinc and other metals, which are then removed from the system where they are either recycled by other industrial processes or disposed of in some environmentally safe manner. The feedstock particles provided from separation means 170 are transported by a conveyance means to dryer 190 to remove any remaining excess water. The conveyance means is preferably a rotary screw conveyor to provide a continuous and uniform flow of carbon black to dryer 190 and to maintain a closed system for the recovery of water by the Steam Generation and Recovery System for reuse, which shall be described later. Other conveyance means such as an auger, bucket conveyor, pneumatic conveyors, gravity, or similar devices may be used when a closed system is not desirable, without departing from the scope of the invention. The water vapor resulting from the drying process and removed from the carbon black is collected as it condenses and is directed to condensate collection tank 300.

During the second stage of the purification and refinement process, sulfur particles are removed by solvent extraction, the solvent is recovered for re-use, and the resulting solids are dried to produce pure carbon black. The solvent is chosen for its ability to dissolve sulfur from the carbon black feedstock. The solvent selected for the process may preferably be benzene, xylene, or toluene, and most preferably toluene. The carbon black feedstock containing sulfur particles, coming from dryer 190 is introduced into solvent mixing tank 200. This tank, like mixing tank 110, contains a mixing means consisting of a high shear agitator 201 for mixing the solids with the chosen solvent and a heating means for holding the solution at an elevated temperature preferably in the range of between approximately 60° C. and approximately 80° C. The carbon black feedstock from dryer 190 is added to a quantity of solvent in mixing tank 200. The solvent is preferably provided from solvent collected downline from the mixing action by condenser 260 but may also be optionally provided from solvent storage tank 270. The solvent will dissolve the sulfur particles and the agitation action of the high shear agitator 201 will maintain a solvent slurry in the solvent mixing tank 200 consisting of carbon black particles admixed in a solution of solvent containing dissolved sulfur. This solvent slurry is pumped via pump 210 into a separation means 220 where the carbon black solid portion is separated from the solvent/sulfur liquid portion. Separation means 220 is preferably a centrifuge, and most preferably a pusher-type centrifuge which removes the carbon black while maintaining a small particle size. Other types of separation means such as filtration devices may also be used without departing from the scope of the invention. These carbon black solids are removed via a conveyance means 225 to dryer 230 where they are dried to remove any remaining solvent. The conveyance means 225 is preferably a screw type conveyor so that the solvent is kept within a closed system and so that the carbon black solids may be moved at a continuous uniform rate, but other means of moving the carbon black which are functionally equivalent may be used without departing from the scope of the invention. The dried carbon black solids 240 emerging from dryer 230 are then either stored for transportation to other locations, pelletized and bagged for shipping, or processed into toner black by a succeeding stage of the system. The solvent/sulfur liquid removed from centrifuge 220 is pumped by pump 235 into evaporation means 250 where the solvent is separated from the sulfur residue by means of evaporation. The evaporation means 250 is preferably a single or multiple effect evaporator of a type well known in the industry, but other types of evaporators may be used without departing from the scope of the invention. Evaporation is accomplished within evaporation means 250 by a heat transfer fluid which is preferably water in the form of steam. In the case where the solvent is toluene, the use of steam requires it to be superheated since the boiling point of toluene 110° C. and the boiling point of water is 100° C. The sulfur 255 removed from evaporation means 250 is of high quality and purity and can be either sent to other locations for use in other processes or discarded in an environmentally safe manner such as a landfill.

The apparatus used to practice the invention employs a Solvent Recovery System for containing solvent vapors for reuse and preventing the vapors from creating an environmental hazard by escaping into the atmosphere. Condenser 260 is provided for condensing the solvent vapor which is produced from either evaporation means 250 or dryer 230. When a Solvent Recovery System such as the one described herein is employed in conjunction with the carbon black purification and refinement system, it is assumed that evaporation means 250 and dryer 230 are enclosed so as to prevent loss of any vapors or gases produced therein. Although condenser 260 can be of any suitable design, the preferred configuration is that of a standard shell and tube heat exchanger. Condenser 260 preferably uses chilled water to condense the solvent vapor, but other suitable heat transfer fluids used in cooling applications and well known to the art may be used without departing from the scope of the invention. The liquid solvent resulting from such condensation is collected in the lower portion of condenser 260 in a collection area which is not shown in the diagram but which is part of condenser 260. When it is required for replenishing the liquid in solvent mixing tank 200, it is pumped from condenser 260 into solvent mixing tank 200 by pump 265. If insufficient amounts of solvent are available from condenser 260, an additional amount of solvent may be obtained for use in solvent mixing tank 200 by pumping it from the solvent storage tank 270 by pump 275. Normally, the amounts of solvent supplied by solvent storage tank 270 are expected to be for priming the system initially with sufficient solvent for the overall process.

A closed loop Steam Generation and Recovery System is provided to supply steam to various components of the system for heating, drying, and/or evaporation, to collect the condensate resulting from the steam condensation, to collect the condensate evaporated from the process materials, and to recycle both back through the system. A closed loop system such as the one described herein is used to prevent build-up of scale and other minerals in the pipes comprising the system and to keep impurities from possibly contaminating the materials being processed. Steam generator 280 produces either steam or superheated steam, depending upon the heating requirements of the particular system component. Normal steam is employed by dryer 190, evaporator 180, and solvent mixing tank 200. Superheated steam is used by evaporation means 250. When each component has used the caloric content of the steam provided to it by steam generator 280 through condensation of the steam, the resulting condensed water is collected in condensate collection tank 290 for reuse within the system. It is normally pumped by pump 295 into acid dilution tank 102 to dilute the hydrochloric acid for use in the first stage of purification and refinement, since, being distilled, it is expected to have no impurities which might contaminate the process. A second condensate collection tank 300 is used to hold both the condensate resulting from evaporation in evaporator 180, the condensate from the steam used to evaporate the condensate within evaporator 180, and the water removed from the carbon black in dryer 190. A source of distilled water (not shown) is used to supply the closed loop system with its initial supply of working fluid. This source is also used to replenish fluid lost through pressure relief or leakage, but this amount of loss is negligible. It should be noted that the number of condensate collection tanks and the choice of tank for collecting the condensate of a particular piece of equipment is arbitrary and dependent upon the plant layout of the system as it is physically configured.

Figure 4:
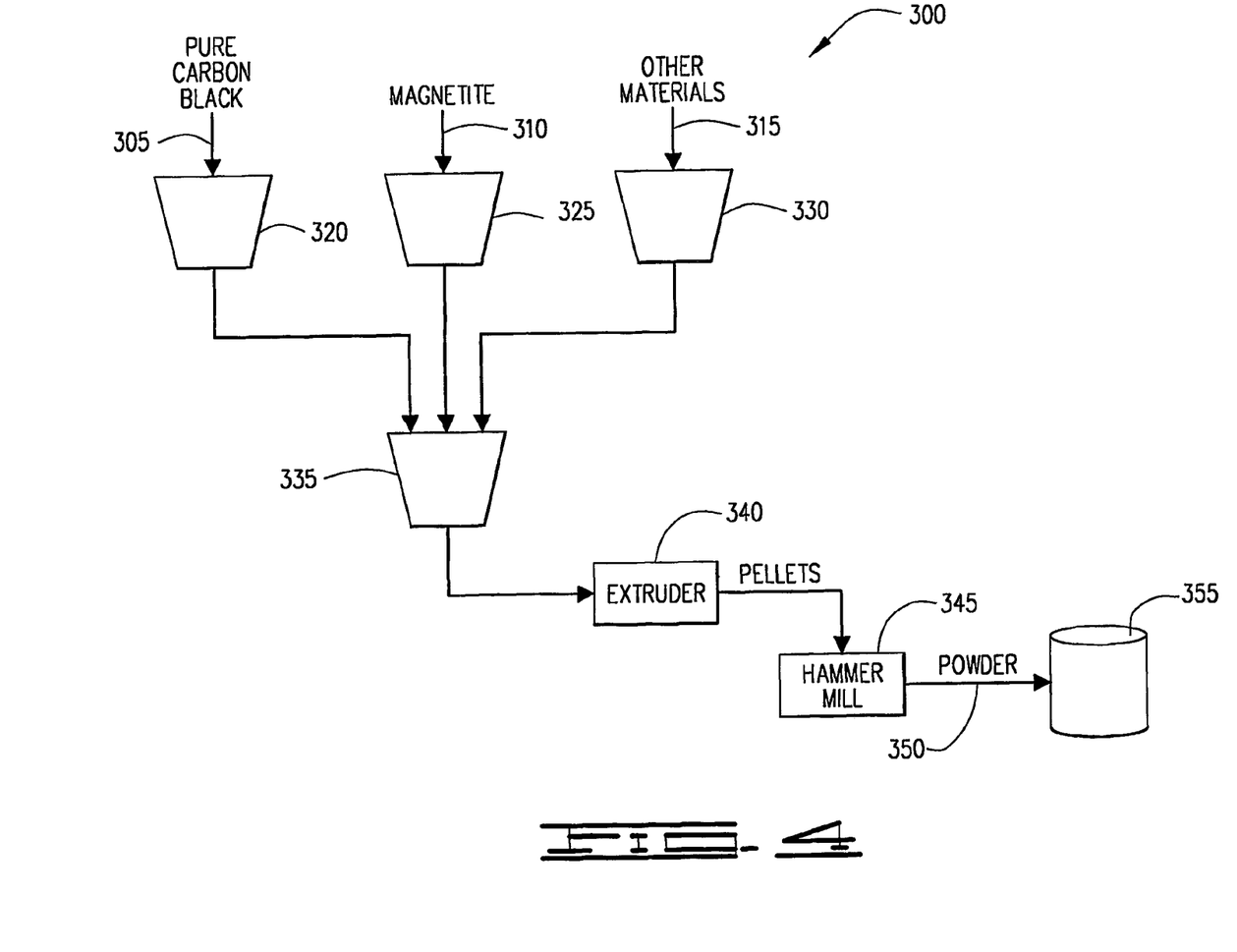

A third stage of the carbon black refinement and purification process may be alternatively used to process refined carbon black into a toner black product. The toner black process 300 depicted in FIG. 4 illustrates such a stage. The pure carbon black 305, from which metal oxides and sulfur have been removed, may be immediately processed at the site by standard methods known to the industry. This method involves collecting the pure carbon black 305 in a suitable solids bin 320 for processing and then mixing with a suitable grade of magnetite 310 from bin 325 and a styrene-acrylic resin 315 from bin 330 to prevent clumping. Other materials, such as titanium dioxide coated with organic compounds to improve flowability, may also be advantageously added to the mixture through bin 330 as needed for various customers' needs. This dry mixture of carbon black, magnetite, and resin is combined in bin 335 and then provided to an extruder 340 of common design known to the art, preferably a twin screw extruder, where it is heated to a temperature necessary to melt the resin so that it coats the particles of carbon black and magnetite. The heated mixture is then extruded through an extruder die to form a column. The extruded column is then formed into pellets by a standard means known to the industry, such as a rotating knife or cutter. The pellets are allowed to fall into a hammer mill 345, preferably by action of gravity. The hammer mill 345 pulverizes the pellets and form a fine toner black powder 350. This powder 350 may by stored in bin 355 for later packaging and shipment; optionally the pellets may also be packaged and shipped.

The practice of the invention does not depend upon the order in which the digestion step and the solvent extraction step are performed. The process shown in FIG. 3 is illustrative of embodiment 10 in FIG. 2. In an alternative embodiment 70 (FIG. 3) of the invention, feedstock 100 could be first fed to solvent mixing tank 200 for solvent extraction of sulfur. The resulting carbon black intermediate product, after recovery of the solvent containing sulfur, could then be fed to tank 110 for digesting with acid and subsequently to tank 140 for neutralization of the resulting acid solution. The apparatus used for separation, drying, evaporation, and dilution could be easily be reconfigured by one skilled in the art according to the requirements of the order of the steps as shown in FIG. 3.

As has been demonstrated, the present invention provides an advantageous system, method, and apparatus for the production of a pure carbon black from feedstock containing significant amounts of metal oxide and sulfur particulate matter, such as the carbon black produced from the pyrolysis of scrap automobile tires. The system operates continuously and not in batches to provide a constant rate of product being produced. Furthermore, the system is closed in the sense that both the solvent and the cooling fluid used in various parts of the equipment are recovered and reused. In the case of a toxic solvent, this reuse provides the further benefit of safety for workers and conformance with governmental regulations controlling the release of hazardous substances. The resulting high quality carbon black can be further processed to form toner black for use in toner cartridges for laser printers and xerography equipment. The cost of purified and refined carbon black produced according to the invention compares favourably with that produced directly from hydrocarbons by more conventional methods.

The present invention has been described with reference to block diagrams illustrating systems, methods, and devices according to embodiments of the invention. It will be understood that each block of the block diagrams, and combinations of blocks in the block diagrams, can be implemented by similar components providing the same or substantially the same functions. While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

The invention claimed is:

1. A method for purification and refinement of carbon black comprising the steps of:
   providing a feedstock comprising a physical combination of particulate carbon black, metal oxides, and sulfur;
   removing the metal oxide particles from the feedstock by introducing the feedstock into an aqueous acidic solution, wherein the aqueous acidic solution dissolves the metal oxide particles from the feedstock; and,
   removing the sulfur particles from the feedstock by introducing the feedstock into a sulfur-dissolving solvent to produce a sulfur-containing slurry, wherein the sulfur-dissolving solvent dissolves the sulfur from the feedstock;
   separating the feedstock from the sulfur-containing slurry;
   evaporating all sulfur-dissolving solvent from the sulfur-containing slurry;
   removing the sulfur remaining after evaporation of the sulfur-dissolving solvent; and
   reusing the sulfur-dissolving solvent.

2. The method of claim 1 wherein the step of removing metal oxide particles comprises the steps of:
   mixing the feedstock with an aqueous acidic solution to chemically react with the metal oxides and form an acidic slurry comprising metal salts in solution; and
   separating the acidic slurry and the feedstock.

3. The method of claim 2, wherein the aqueous acidic solution is hydrochloric acid.

4. The method of claim 3, wherein the aqueous acidic solution has a concentration of 2N.

5. The method of claim 1, wherein the step of removing sulfur particles further comprises
   heating the sulfur-containing slurry to a selected temperature of less than 110° C.

6. The method of claim 1, further comprising the steps of:
   agitating the sulfur-containing slurry at a temperature selected to maintain the sulfur and admixed carbon black particles in solution;
   removing the feedstock from the sulfur-containing slurry;
   separating the dissolved sulfur from the sulfur-containing slurry by evaporating the sulfur-containing solvent; and
   recycling the resultant sulfur-dissolving solvent.

7. The method of claim 6, wherein the step of separating the dissolved sulfur from the sulfur-containing slurry is accomplishing by evaporating the sulfur-dissolving slurry to produce sulfur-dissolving solvent vapor and sulfur solids.

8. The method of claim 1 wherein the step of removing the sulfur particles from the feedstock by introducing the feedstock into a sulfur-dissolving solvent to produce a sulfur-containing slurry comprises the step of:
   agitating the sulfur-containing slurry at a temperature in a range of between approximately 60° C. and approximately 80° C., wherein the carbon black particles are admixed in the sulfur-dissolving solvent containing dissolved sulfur.

9. The method of claim 1, further comprising the step of:
   mixing toner black components to the feedstock to form a toner portion.

10. The method of claim 9, wherein the toner black components are comprised of magnetite and a resin.

11. The method of claim 10, further comprising the step of:
    extruding the toner portion to form pellets.

12. The method of claim 11, further comprising the step of:
    pulverizing the pellets to form a powder.

13. A process for purification and refinement of a carbon black feedstock comprised of a physical mixture of carbon black, metal oxide, and sulfur particles, the process comprising the steps of:
    providing the feedstock at a continuous and uniform rate;
    mixing the feedstock with an aqueous solution containing an acid to chemically react with the metal oxide particles contained in the feedstock and form a first liquid portion and a first solid portion, the first liquid portion comprising an acid slurry comprising metal salts in solution, the first solid portion comprising feedstock particles;
    separating the first liquid portion from the first solid portion;
    adding the first solid portion to a sulfur-dissolving solvent to form a solvent slurry, wherein the sulfur particles contained in the first solid portion are dissolved by the sulfur-dissolving solvent;
    agitating the solvent slurry at a temperature in a range of between approximately 60° C. and approximately 800° C., in order to maintain the solvent slurry having a second liquid portion comprising a solution of sulfur-dissolving solvent and the sulfur and a second solid portion comprising admixed feedstock particles;
    removing the second solid portion;
    evaporating the sulfur-dissolving solvent from the remaining solvent slurry to provide solid sulfur; and
    condensing the sulfur-dissolving solvent for reuse.

14. The method of claim 13, further corrriprising the step of:
    neutralizing the first liquid portion with an alkaline solution.

15. The method of claim 14, wherein the alkaline solution is comprised of sodium hydroxide.

16. The method of claim 13, wherein the sulfur is separated from the sulfur-dissolving solvent by an evaporation means within a closed system.

17. A method for purification and refinement of carbon black comprising the steps of:
    providing a feedstock comprising a physical combination of particulate carbon black, metal oxides, and sulfur;
    removing the metal oxide particles from the feedstock by introducing the feedstock into an aqueous acidic solution, wherein the aqueous acidic solution dissolves the metal oxide particles from the feedstock;
    removing the sulfur particles from the feedstock by introducing the feedstock into a sulfur-dissolving solvent to produce a sulfur-containing slurry, wherein the sulfur-dissolving solvent dissolves the sulfur from the feedstock; and,
    neutralizing the aqueous acidic solution with an alkaline solution.

18. The method of claim 17, wherein the sulfur-dissolving solvent is selected from a group composed of xylene, benzene, and toluene.

19. The method of claim 17, wherein the alkaline solution is comprised of sodium hydroxide.

20. The method of claim 17, further comprising the step of filtering the feedstock from the sulfur-containing slurry; and evaporating the sulfur-dissolving solvent from the sulfur-containing slurry from which the feedstock has been removed, wherein the sulfur is removed and the sulfur-dissolving solvent is reused.

21. The method of claim 20, wherein the step of evaporating the sulfur-dissolving solvent from the sulfur-containing slurry further comprises heating the sulfur-containing slurry to a selected temperature of less than 110° C.

* * * * *